US009645914B1

(12) United States Patent
Zhang et al.

(10) Patent No.: US 9,645,914 B1
(45) Date of Patent: May 9, 2017

(54) APPS STORE WITH INTEGRATED TEST SUPPORT

(71) Applicant: GOOGLE INC., Mountain View, CA (US)

(72) Inventors: Hong Zhang, Mountain View, CA (US); Li Yin, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 75 days.

(21) Appl. No.: 13/891,737

(22) Filed: May 10, 2013

(51) Int. Cl.
*G06F 9/445* (2006.01)
*G06F 11/36* (2006.01)

(52) U.S. Cl.
CPC ............ *G06F 11/3664* (2013.01); *G06F 8/60* (2013.01); *G06F 8/61* (2013.01); *G06F 8/65* (2013.01); *G06F 11/3688* (2013.01)

(58) Field of Classification Search
CPC ..... G06F 8/60; G06F 8/61; G06F 8/65; G06F 11/3664; G06F 11/3688
See application file for complete search history.

(56) References Cited

U.S. PATENT DOCUMENTS

| 6,266,788 | B1 * | 7/2001 | Othmer et al. ............ 714/38.11 |
| 7,003,478 | B1 * | 2/2006 | Choi ...................... G06Q 30/02 705/14.73 |
| 7,124,401 | B2 * | 10/2006 | Muller et al. .................. 717/124 |
| 7,146,603 | B2 * | 12/2006 | Kerpan ............. G06F 17/30607 717/127 |
| 7,231,637 | B1 | 6/2007 | McEwan |
| 7,555,532 | B2 * | 6/2009 | Decasper et al. ............. 709/217 |
| 7,874,008 | B2 * | 1/2011 | Chang et al. .................... 726/27 |
| 7,908,521 | B2 * | 3/2011 | Sridharan et al. ........... 714/47.1 |
| 8,255,879 | B2 * | 8/2012 | Wenger ......................... 717/130 |
| 8,271,950 | B2 | 9/2012 | Bharadwaj |
| 8,433,785 | B2 * | 4/2013 | Awadallah et al. ........... 709/224 |
| 8,631,390 | B2 * | 1/2014 | Cox et al. ...................... 717/122 |
| 8,688,491 | B1 * | 4/2014 | Shenoy et al. ............... 705/7.11 |
| 8,689,108 | B1 * | 4/2014 | Duffield et al. ............... 715/737 |
| 8,862,947 | B1 * | 10/2014 | Gray ................... G06F 11/0709 717/177 |

(Continued)

OTHER PUBLICATIONS

Caius Brindescu et al., How Do Centralized and Distributed Version Control Systems Impact Software Changes, 2014, ACM, retrieved online on Nov. 20, 2016, pp. 322-333. Retrieved from the Internet: <URL: http://delivery.acm.org/10.1145/2570000/2568322/p322-brindescu.pdf?>.*

(Continued)

*Primary Examiner* — Thuy Dao
*Assistant Examiner* — Hanh T Bui
(74) *Attorney, Agent, or Firm* — Morris & Kamlay LLP (57) ABSTRACT

Systems and techniques are disclosed for providing a standard version of an application to a first user, receiving a request for the application from a second user, identifying the second user as a test user, and providing a second version of the application to the second user based on the identification. Interaction events with the second version of the application, by the second user, may be reported and used by the arrangement to modify the second version of the application. Alternatively, a second user may reject the second version of the application and the second user's status may be modified based on the rejection.

20 Claims, 4 Drawing Sheets

(56) References Cited

U.S. PATENT DOCUMENTS

| | | | | |
|---|---|---|---|---|
| 8,869,143 | B2* | 10/2014 | Bocking et al. | 717/178 |
| 8,892,954 | B1* | 11/2014 | Gray | G06F 8/65 717/176 |
| 9,009,536 | B2* | 4/2015 | Dancy | G06F 11/3684 717/124 |
| 9,396,092 | B1* | 7/2016 | Kuo | G06F 11/3664 |
| 9,405,665 | B1* | 8/2016 | Shashi | G06F 11/3688 |
| 2002/0069263 | A1* | 6/2002 | Sears et al. | 709/218 |
| 2002/0133695 | A1* | 9/2002 | Khatri | G06F 9/4411 713/1 |
| 2004/0015868 | A1 | 1/2004 | Dutta et al. | |
| 2004/0128651 | A1* | 7/2004 | Lau | G06F 11/3664 717/124 |
| 2006/0294158 | A1* | 12/2006 | Tsyganskiy et al. | 707/202 |
| 2007/0240102 | A1* | 10/2007 | Bello et al. | 717/104 |
| 2008/0115107 | A1* | 5/2008 | Arguelles | G06F 9/5027 717/124 |
| 2008/0126773 | A1* | 5/2008 | Martinez | G06F 21/57 713/1 |
| 2008/0263543 | A1* | 10/2008 | Ramachandran | 717/177 |
| 2008/0301672 | A1* | 12/2008 | Rao et al. | 717/177 |
| 2009/0183084 | A1 | 7/2009 | Robertson | |
| 2009/0210921 | A1* | 8/2009 | Ramsdell | 725/120 |
| 2009/0327815 | A1* | 12/2009 | Sridharan et al. | 714/38 |
| 2010/0082813 | A1 | 4/2010 | Li et al. | |
| 2010/0153780 | A1 | 6/2010 | Kirtkow et al. | |
| 2011/0225139 | A1* | 9/2011 | Wang et al. | 707/709 |
| 2011/0258609 | A1* | 10/2011 | Maczuba | 717/128 |
| 2012/0079477 | A1* | 3/2012 | Boss et al. | 717/178 |
| 2012/0239752 | A1* | 9/2012 | Gopinath et al. | 709/204 |
| 2012/0278903 | A1* | 11/2012 | Pugh | 726/28 |
| 2012/0311387 | A1 | 12/2012 | Santhosh et al. | |
| 2013/0042230 | A1* | 2/2013 | Little | G06F 8/65 717/173 |
| 2013/0346268 | A1* | 12/2013 | Pereira et al. | 705/34 |
| 2014/0040871 | A1* | 2/2014 | Schwan et al. | 717/141 |
| 2014/0189648 | A1* | 7/2014 | Everitt | 717/125 |

OTHER PUBLICATIONS

International Search Report and Written Opinion in Application No. PCT/037321 mailed Sep. 12, 2014.

Behrens, "How does an App Store/Market work?", Retrieved from the Internet, http://www.net.in.tum.de/fileadmin/TUM/NET/NET-2012-08-1/NET-2012-08-1_07.pdf, Retrieved on Aug. 12, 2014.

* cited by examiner

APPS STORE WITH INTEGRATED TEST SUPPORT

BACKGROUND

Currently, there are multiple electronic application stores from which users can download applications. Generally, only the latest version of an application is available in the store at any given time. A developer that intends to offer multiple versions of the same application is commonly required to publish two or more separate applications (i.e., not two versions of the same application), which may increase maintenance costs, time, publish time, and the review process. Traditionally, application stores don't allow multiple applications under the same application id, which can require developers to change the application and potentially break how applications communicate with each other. An application developer may benefit from publishing test versions of an application to a small group of users, receiving feedback, and fixing bugs prior to publishing the application to the general public. Given a traditional application store, a developer cannot publish a test version of an application inside the application store to a limited set of users, and may be required to use other channels to distribute such test apps.

BRIEF SUMMARY

According to implementations of the disclosed subject matter, an arrangement may provide a first version of an application to a user via an online application store. The arrangement may receive a request for the application from a different user, identify the different user as being a second user, and provide a second version of the application to the second user based on the identification. Interaction events with the second version of the application by the user identified as a test user may be recorded and reported to the arrangement. If a test version of an application is made available to a test user group, and the second user has a membership with the group, the second user is considered a test user and the test version of the application is made available to the second user. Alternatively, the second user identified as a test user may reject the test version of the application and the arrangement may provide the test user with the first version of the application and, additionally, change the user's status It is also possible that an app developer may provide multiple versions of the same application to multiple groups, such as alpha test, beta test, release-candidate, etc. If a user is part of multiple groups, multiple versions of the application may be provided to the user at the same time and the user may decide which version to download and/or install.

Systems and techniques according to the present disclosure allow for identification of a user as a test user and provide the user with a test version of the application. The user may reject the application and the user's status may be modified or the user may interact with the application and interaction events may be reported to the arrangement. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Providing a single version of an application to users via an application store may limit a developer's ability to test a newer version of an application using a test group of users. Specifically, an arrangement configured such that only one version of an application is available to an application store does not allow a developer to provide a different version of the application to different groups of users. According to implementations of the disclosed subject matter, a user may receive a version of an application or have the option to receive a version of an application based on the user's status or choice or based on a group of which the user is a part. As disclosed herein, a test version of an application may be any version of the application that is not released to the general public and may be in a testing, experimental, or an in-development stage. Accordingly, a user that is part of a test group may be provided a test version of an application, as disclosed herein. Additionally, multiple test versions and multiple test groups may co-exist at the same time such that a single application may have two or more test versions and a single user may be part of two or more groups. A standard version of an application may be any production version of an application such as a version that is released to the general public. Accordingly, a user that is not part of a test group or is part of a standard group may be provided a standard version of an application, as disclosed herein. As an example, a user that is part of a test group and a standard group may be provided with both a test version of an application and a standard version of the same application. An arrangement may receive a request for an application from a user by the user accessing an application store using an electronic device. The arrangement may identify the user as part of a non-test group based on any applicable factor, as disclosed herein. Accordingly, the user may be provided with a standard version (e.g., a tested and publicly released version) of the application based on the identification. The arrangement may receive a request for an application from another user via the application store. The arrangement may identify the user as part of a test group based on any applicable factor, as disclosed herein, and may provide the user with a test version of the application based on the identification. For example, the arrangement may receive user settings data and detect that the user selected a setting to receive test versions of applications, or may identify the user as part of a test group. Accordingly, the user may be provided either a test version of the application or both a standard version and a test version of the application. User interaction with a test version of the application may be recorded and reported to the developer or any applicable entity such that the test application may be evaluated and/or improved based on the interaction.

Figure 1:
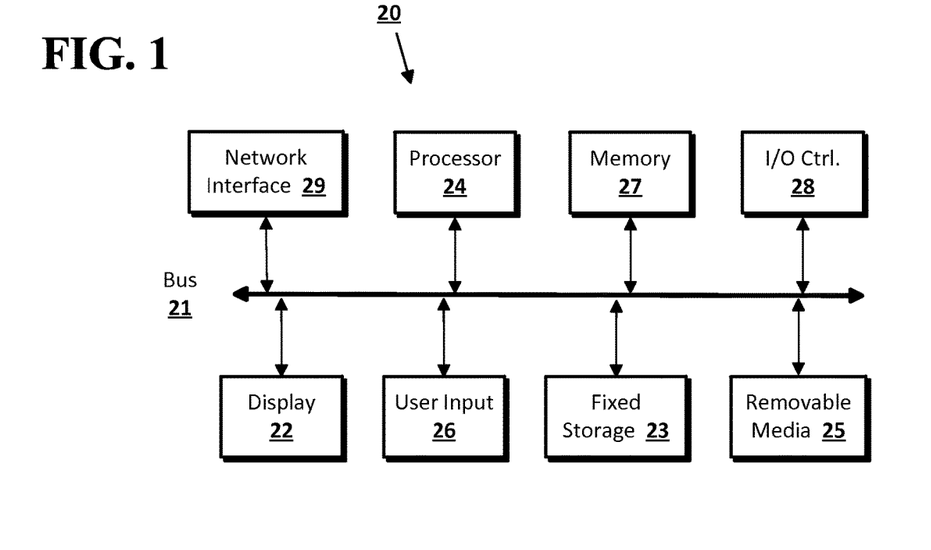
FIG. 1 shows a computer according to an implementation of the disclosed subject matter.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
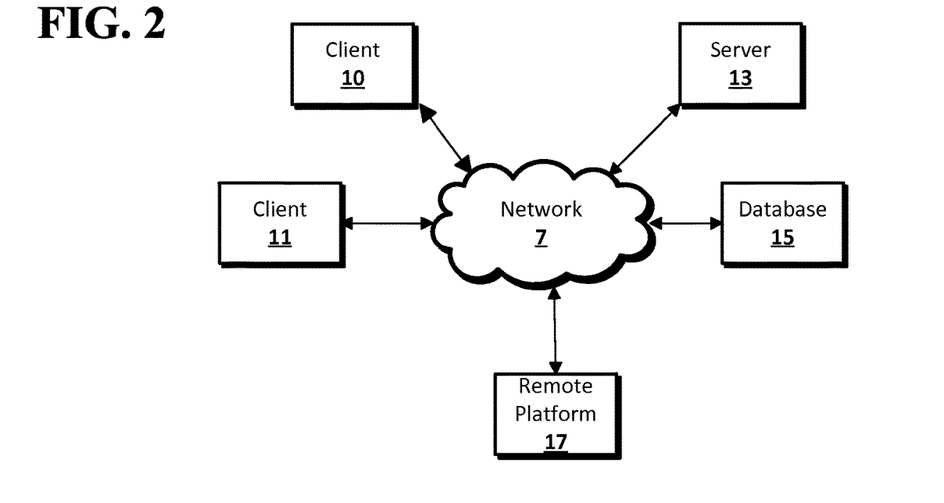
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
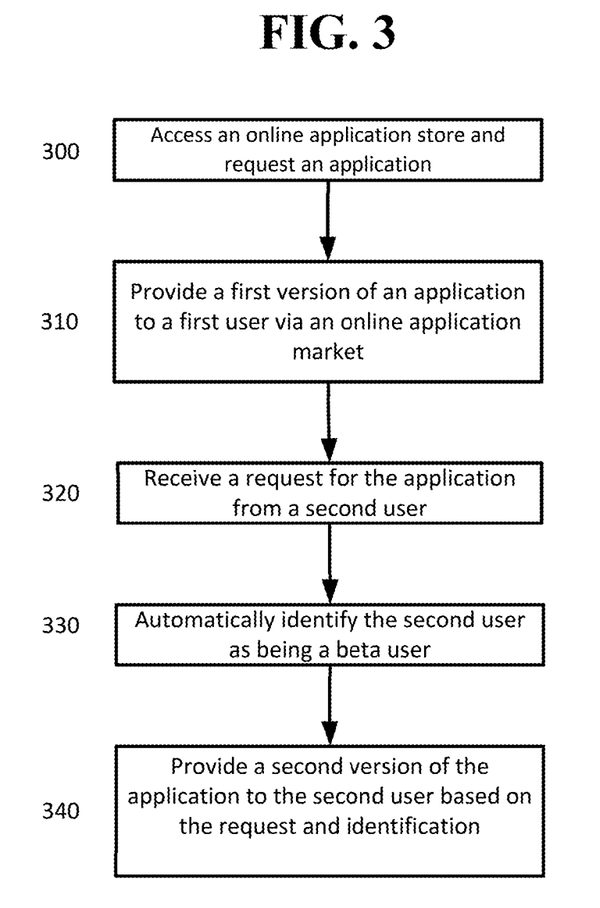
FIG. 3 shows an example process for providing a version of an application to a user, according to an implementation of the disclosed subject matter.
Figure 4A:
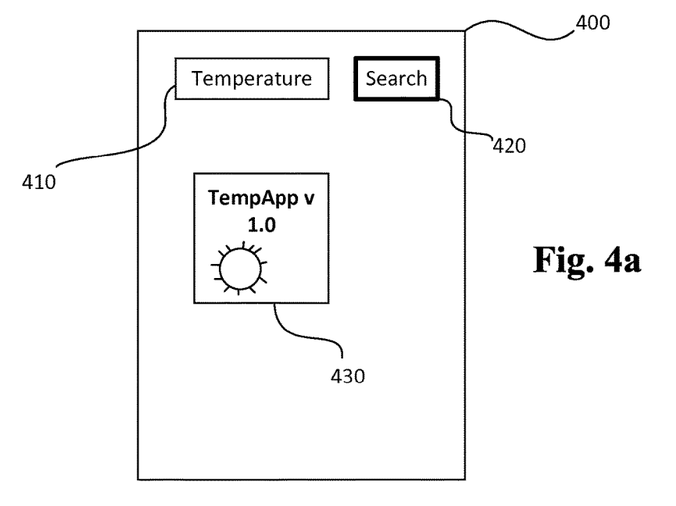
FIG. 4a shows an example illustration of providing a standard version of an application to a user, according to an implementation of the disclosed subject matter.

According to an implementation of the disclosed subject matter, as shown at step 300 in FIG. 3, a first user may access an online application store and request an application by any applicable method such as by inputting a search term related to the application into a search query box, by selecting an external link, by an automated process as a result of a user action (e.g., accessing a webpage, selecting an update option, etc.), or the like. The arrangement may identify the user and/or user account as a being a part of a primary group that receives a standard version of the requested application. The user and/or user account may be identified as part of a primary group based on any applicable inferential characteristic such as user history (e.g., a user that opts for a standard version of an application, a user that does not modify at least a threshold number of default settings on a device, a user that does not spend a threshold amount of time using a device or application, etc.), a user device (e.g., a device model, a device type, peripherals connected to a device, etc.), device software (e.g., type of software installed on the device, version of software installed on a device, etc.), or the like. A primary group can be a group that contains a majority of users that may request and/or receive the application. As an example, the primary group may be the general public that is intended to receive and use a public version (i.e., a standard version) of a given application. As shown at step 310 in FIG. 3, a standard version of an application may be provided to a user that is identified as part of a primary group. The standard application may be provided to the user via an application store that the user interacts with to receive applications. As an illustrative example, as shown in FIG. 4a, a user may access an application store 400 using a mobile device by selecting an application store launch button accessible via the mobile device. The user may input text (e.g., "Temperature") related to an intended application into the search input box 410 and may select a search button 420 to initiate the search. The arrangement may access user settings and determine that the user selected a setting that disables test versions of applications from being downloaded on the mobile phone. Accordingly, the arrangement may identify the user as part of a primary user group and provide the user with a standard (i.e., non-test) version of the application 430. Subsequently, the user may select the standard version of the application 430 and the standard application may be downloaded and installed on the mobile device for the user to use in an intended manner.

According to an implementation of the disclosed subject matter, as shown at step 320 in FIG. 3, a second user may access an online application store and request an application by any applicable method such as by inputting a search term related to the application into a search query box, by selecting an external link, by an automated process as a result of a user action (e.g., accessing a webpage, selecting an update option, etc.), or the like. The arrangement may identify the user and/or user account as a being a part of a secondary group that receives a secondary version of the requested application. At step 330, the second user and/or related user account may be identified as part of a secondary group based on any applicable inferential characteristic such as user history (e.g., a user that opts for test versions of applications, a user that modifies at least a threshold number of default settings on a device, a user that spends a threshold amount of time using a device or application, etc.), a user device (e.g., a device model, a device type, peripherals connected to a device, etc.), device software (e.g., type of software installed on the device, version of software installed on a device, etc.), or the like. A secondary group can be a group that contains a subset of users from an overall set of users that may request and/or receive the application. As an example, the secondary group may contain a set of advanced users that prefer to download test versions of applications (e.g., an updated version of an application that is not yet released to the general public and may be in a testing phase). The second user may be automatically identified as part of a secondary group such that the arrangement may automatically access data that allows identification of the second user as part of the secondary group without requiring the second user to specifically identify herself as a part of a secondary group.

According to an implementation of the disclosed subject matter, a user may be part of multiple groups and may be designated as part of the multiple groups based on the criteria disclosed herein. As an example, a user may be part of both a test group and a standard group based on user history and a user setting. A developer may publish multiple versions of an application and may designate groups of users that receive respective versions of the application. Accordingly, a user that is part of multiple groups may have the option to download and/or install multiple versions of an application. As an example, a developer may release a standard version and a test version of an application. A user that is part of a test group and a standard group may request the application using an application store. Both the test version and the standard version may be provided to the user and the user may be given the option to download and/or install either one or both versions of the application.

Figure 4B:
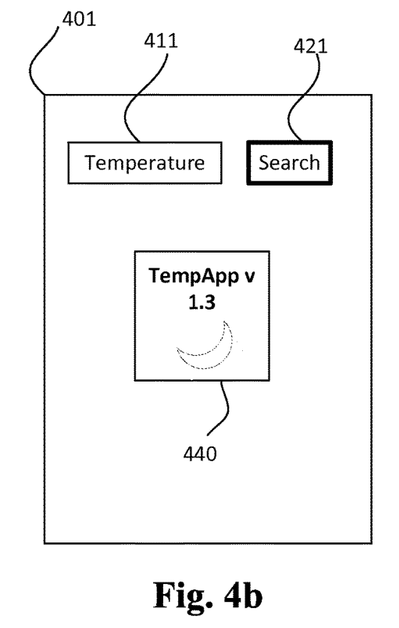
FIG. 4b shows an example illustration of providing a test version of an application to a user, according to an implementation of the disclosed subject matter.

As shown at step 340 in FIG. 3, a secondary version of an application may be provided to a user that is identified as part of a secondary group. The secondary version of the application may be provided to the user via the application store that the user interacted with to search for the application. As an illustrative example, as shown in FIG. 4b, a user may access an application store 401 using a mobile device by selecting an application store launch button accessible via the mobile device. The user may input text (e.g., "Temperature"), corresponding to an application that the user intends to download, into the search input box 410 and may select a search button 420 to initiate the search. The arrangement may access user history and determine that the user has modified 12% of the default user settings on her mobile device and may determine that the user is part of a secondary group of users based on the 12% modification and a 10% threshold modification value. Accordingly, based on this determination, the arrangement may provide the user with a test version of the application 440. It will be understood that any threshold value may be used for the number of changes made, or other thresholds described herein, and the specific values given are illustrative only.

Figure 4C:
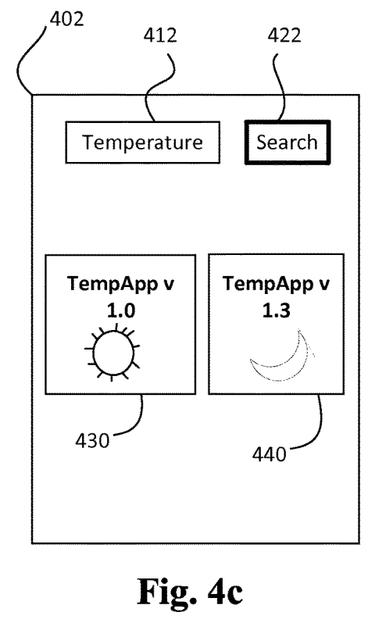
FIG. 4c shows an example illustration of providing a standard version and a test version of an application, according an implementation of the disclosed subject matter.

Similarly, as shown in FIG. 4c, a user may search for an application using a search box 412 and search button 422 by accessing an application store 402 using an application device. The arrangement may determine that the user is part of a secondary group of users based on any applicable factor, as discussed herein, and provide the user with both a standard version of an application 430 as well as a test version of the application 440. Notably, according to this example, the user identified as part of a secondary group may have the option to download the same version of an application as a primary group of users or a secondary version of an application provided to the user based on the arrangement identifying him as part of the second group. As used herein, a single version of an application may be provided to multiple users such that there may be multiple specifically installed instance of the same version of the application on multiple devices. As a specific example, a test version of a temperature based application may be installed on 400 devices that have been identified as test user devices based on criteria disclosed herein.

According to an implementation of the disclosed subject matter, the arrangement may receive interaction data from the use of an application by a user that receives a secondary version of the application. Interaction data may be any applicable data that the arrangement is configured to collect and may include data such as application efficiency, time lapses (e.g., time required to activate the application, in app delays, server communication times, etc.), latency information, application specific data (e.g., proprietary data, use data, page/area view data, etc.), item selection information (e.g., button selection, link selection, proprietary item selection, etc.), item request information (e.g., data request, component request, object request, etc.), or the like. For example, an arrangement may receive interaction data corresponding to the areas of an application that a user of a secondary version of an application visits, such as a list of specific sub-pages under a broad page category visited by the user. Interaction data may be collected as a result of any applicable interaction event caused either by the application, arrangement, or a user using a secondary version of the application such as a user input, a user comment, a user generated report, a user decision, a time calculation, an error, a predetermined collection signal, or the like. For example, interaction data may be collected when a user of a secondary version of an application selects a "Report" button from within the secondary version of the application. The interaction data may be provided to the arrangement during a predetermined time or based on a rule. A predetermined time may be set by the arrangement such that interaction data collected prior to the set time is transmitted to a local or remote server at the predetermined time. One or more rules for providing interaction data may be based on any applicable criteria such as amount of interaction data collected, a request for interaction data, a data priority level (e.g., based on a high priority interaction event, a security concern, etc.), a dynamically determined time (e.g., from an event, from a previous transmission of interaction data, prior to a subsequently scheduled transmission, etc.), or the like. A test report based on the collected data may be generated prior to or after transmitting the collected data to the local or remote server and may be used by a developer to update the secondary version of the application. The test report may contain textual or graphical representation of user input data, application error data, application event data, user comments, or similar information. As an example, a daily report containing all the interaction data corresponding to a specific portion of an application may be generated by the secondary version of an application and transmitted to a central server corresponding to the application via a satellite in communication with both the central server and the device that the secondary version of the application is installed on. The test report may be generated based on each occurrence of an interaction event, once a threshold number of interaction events are recorded, or once a certain amount of time has expired. As an example, interaction event information may be transmitted to a central server by a test application installed on a user device. The central server may generate a daily test report based on any errors extracted from the interaction event information and provide the daily test report to a developer via email. User permission may be requested prior to transmitting at least a subset of the interaction data collected by a second version of an application. The permission may be requested at any applicable time such as when allowing a user to select a device setting, when providing the second version of the application, when installing the second version of the application, when initiating the second version of the application, when transmitting the data, or the like. The user may be able to configure a setting that enables or disables transmission of the interaction data and/or a report related to the interaction data.

According to an implementation of the disclosed subject matter, a user or user account may be associated with a status which may be a factor in determining a group of which the user is a part, as disclosed herein. For example, a user may be categorized as a tester and, accordingly, placed in a test group. A user status may be modified for any applicable reason such as a status change request (e.g., initiated by a user, the arrangement, or a system moderator), a scheduled modification (e.g., after a predetermined or dynamically determined amount of time), one or more rules (e.g., retaining or losing a threshold amount of points, accepting or rejecting one or more versions of an application, changing a location, modified behavior, etc.), or the like. As an example, a user may be identified as part of a secondary user group and a test version of an application may be provided to the user via an online application store. The user may reject the test version of the application and opt to download a standard version of the application. Based on the rejection of the test version of the application, the standard version of the application may be provided to the user and, additionally, the user's status may change from a test user to a general user.

Figure 5:
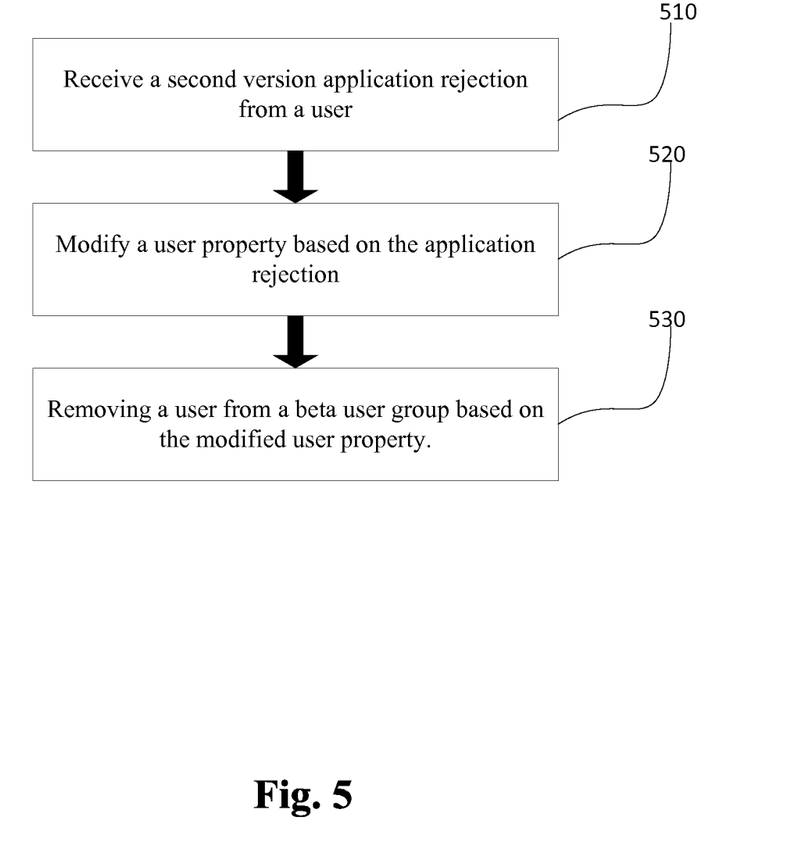
FIG. 5 shows an example process for modifying a user status, according to an implementation of the disclosed subject matter.

According to an implementation of the disclosed subject matter, a value may be associated with a user account. The value may be any applicable currency such as points, stars, levels, or the like. The value may be adjusted based on application version decisions made by a user and may or may not be visible to a user. A value may be provided to a user (e.g., displayed to a user when the user accesses a user account, transmitted to a user via an electronic mail or message, etc.) and the user may be incentivized to receive additional value or remove value from her account. Alternatively, a value may be associated with a user but not made available to the user (e.g., associated with an account but not visibly displayed to the user). Notably, the arrangement may utilize value associated with a user account to provide benefits to a user and/or to identify the user with a user group. As an example, a user identified as a secondary user may be presented a test version of an application for download via an online application store. The user may reject the test version of the application (e.g., at operation 510 shown in FIG. 5) and opt to download a standard version of the application. Accordingly, a standard version of the application may be provided to the user and a number of points previously allocated to the user's user account may be removed from the user account (e.g., operation 520 shown in FIG. 5). More specifically, if 150 points were originally allocated to the user account, 30 points may be deducted from the 150 (i.e., 120 points remain allocated to the user account) based on the rejection of a test version of the application. According to this example, the arrangement may be configured to change a user's status to a general user if less than 100 points are allocated to the user's account. Accordingly, if the user rejects an additional test application, the user may lose 30 more points, resulting in a total of only 90 points allocated to the user account. Based on the 100 point minimum rule, the user's status may change and she may be removed from a test user group and made part of a general group. Similarly, as another example, a general user's account may initially be allocated 0 points. The user may request test versions of four different applications and be rewarded 30 points per request. Accordingly, the user's account may be allocated 120 points and, based on meeting a 100 point threshold, the user's status may change from a general user to a test user and she may be removed from a general group and be added to a test user group (e.g., at operation 530 shown in FIG. 5).

According to an implementation of the disclosed subject matter, an application may be modified based on interaction event information and/or test reports generated based on the use of a second version of an application. As an example, a test report may be generated based on Abe's use of a test version of the application. The test report may indicate that the test version of the application ceased responding to user input 48% of time after a user selected an option B from within the test application. Accordingly, the test application may be modified to remove option B to avoid the problem identified in the test report. One or more modifications may be made either by a developer or automatically by the arrangement. A modification may be automatically deployed to the group of users (e.g., the group of users that received a secondary version of the application, the group of users that reported an interaction event which was cured by the modification, etc.) or may be incorporated into a tertiary version of the application. The tertiary version of the application may be offered via an application store using the same techniques as disclosed herein for providing a second version of the application.

According to an implementation of the disclosed subject matter, a user may obtain different versions of an application for different amounts of any applicable valuable such as currency, account points, stars, levels, or the like. For example, a standard version of an application may cost a user a greater amount of money than a test version of the same application. Alternatively, in a point based arrangement, fewer points may be deducted from a user's account for opting to download a test version of an application than for option to download a standard version. Notably, a user may be more incentivized to download a test version of an application than a standard version of the application which may allow a developer to collect more data from a broader test application user base.

In an example of the disclosed subject matter, Abe may access an application store on his mobile phone by selecting an icon corresponding to the application store. From within the application store, Abe may enter the search term "Card Game" into a search box to initiate a search related to the search term. The arrangement may determine that Abe is part of a primary group of users based on Abe's previous download history of rejecting test versions of applications for download and, alternatively, opting for standard versions of the same application. Accordingly, the application store may provide Abe with a standard version of the application "Game of Cards" based on the search term and the determination that Abe is part of the primary group of users. Bob may access an application store on his tablet by selecting an icon corresponding to the application store. From within the application store, Bob may enter the search term "Card Game" into a search box to initiate a search related to the search term. The arrangement may determine that Bob is part of a secondary group of users based on Bob's modification of 24% of the default settings on his tablet. Accordingly, the application store may provide Bob with both a standard version and a test version of the application "Game of Cards" cards based on the search term and the determination. Bob may opt to download and install the test version of the application and, subsequently, initiate interaction with the test version of the application. The test application may record interaction events such as abnormal latency times as well as application errors and transmit the recorded interaction events to a server. The server may generate a report containing information regarding the latency times and application errors and provide the report to an application developer that utilizes the report to modify a subsequent version of the application. The subsequent version of the application may be deployed to Bob and/or a group of test users as either a secondary version of the application or as a standard (e.g., non-test) version of the application. The server, as disclosed herein, may be any applicable entity such as central server, local server, application server, a mobile device, an application store or the like. Notably, the event reporting, recording, and report generation may be conducted by any system configured to conduct such tasks.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
providing a first version of an application to a first user, via an online application store; receiving a request for the application from a second user;
automatically identifying the second user as being a test user according to whether settings of a device of the second user have been modified in a percentage amount that is greater than a threshold percentage modification amount;
providing a second version of the application different than the first version to the second user, via the online application store, based on the request and on the step of automatically identifying the second user as being a test user;
generating a test report after receiving a first interaction event by the second version of the application;
providing the test report based only on the first interaction event;
providing a modified second version of the application based on interaction event information and the test report generated based on the use of the second version of the application;
receiving a second version application rejection from the second user;
providing the first version of the application to the second user; and
changing the second user's status based on receiving the second version application rejection from the second user.

2. The method of claim 1, further comprising identifying the second user as a standard user and providing the first version and the second version of the application to the second user.

3. The method of claim 1, further comprising removing the second user from a test user group on receiving the second version application rejection from the second user.

4. The method of claim 1, wherein the second user is identified as a test user based on at least a first inferential characteristic.

5. The method of claim 4, wherein the first inferential characteristic is a user device.

6. The method of claim 4, wherein the first inferential characteristic is based on a user history.

7. The method of claim 4, wherein the first inferential characteristic is based on a user preference.

8. The method of claim 1, wherein the first interaction event is selected from a group consisting of a user input, an application error, an application event, and a user comment.

9. The method of claim 1, wherein the test report comprises data selected from a group consisting of user input data, application error data, application event data, and user comment data.

10. The method of claim 1, further comprising:
modifying the second version of the application based on the test report; and
providing the modified second version of the application to a third user.

11. The method of claim 10 wherein the third user and the second user are the same.

12. The method of claim 10 wherein the third user and the second user are identified as being part of the same group of test users.

13. The method of claim 10 wherein the third user and the second user are identified as being part of a different group of test users.

14. The method of claim 1 wherein the first user is required to pay a first value for the first application and the second user is required to pay a second value for the second application.

15. The method of claim 14, wherein the second value is less than the first value.

16. The method of claim 1, wherein the generated test report includes at least one from the group consisting of: a textual representation of user input data, graphical representation of user input data, application error data, application event data, and user comments.

17. The method of claim 1, where the generated test report includes all interaction data that corresponds to a specific portion of the application.

18. A system comprising:
a database storing version information for first and second versions of an application;
at least one processor in communication with the database, the at least one processor configured to:
provide the first version of an application to a first user, via an online application store;
receive a request for the application from a second user;
automatically identify the second user as being a test user according to whether settings of a device of the second user have been modified in a percentage amount that is greater than a threshold percentage modification amount;
provide the second version of the application to the second user, via the online application store, based on the request and on the step of automatically identifying the second user as being a test user;
generate a test report after receiving a threshold number of interaction events; provide the test report based on the threshold number of interaction events;
provide a modified second version of the application based on interaction event information and the test report generated based on the use of the second version of the application;
receive a second version application rejection from the second user;
provide the first version of the application to the second user; and
change the second user's status based on receiving the second version application rejection from the second user.

19. The system of claim 18, wherein the test report includes at least one from the group consisting of: a textual representation of user input data, graphical representation of user input data, application error data, application event data, and user comments.

20. The system of claim 18, where the generated test report includes all interaction data that corresponds to a specific portion of the application.

* * * * *